Dec. 15, 1959  R. E. WAMSLEY  2,916,902
ADJUSTABLE FASTENER FOR THE LID OF THE
LUGGAGE COMPARTMENT OF AN AUTOMOBILE
Filed Feb. 4, 1958  3 Sheets-Sheet 1
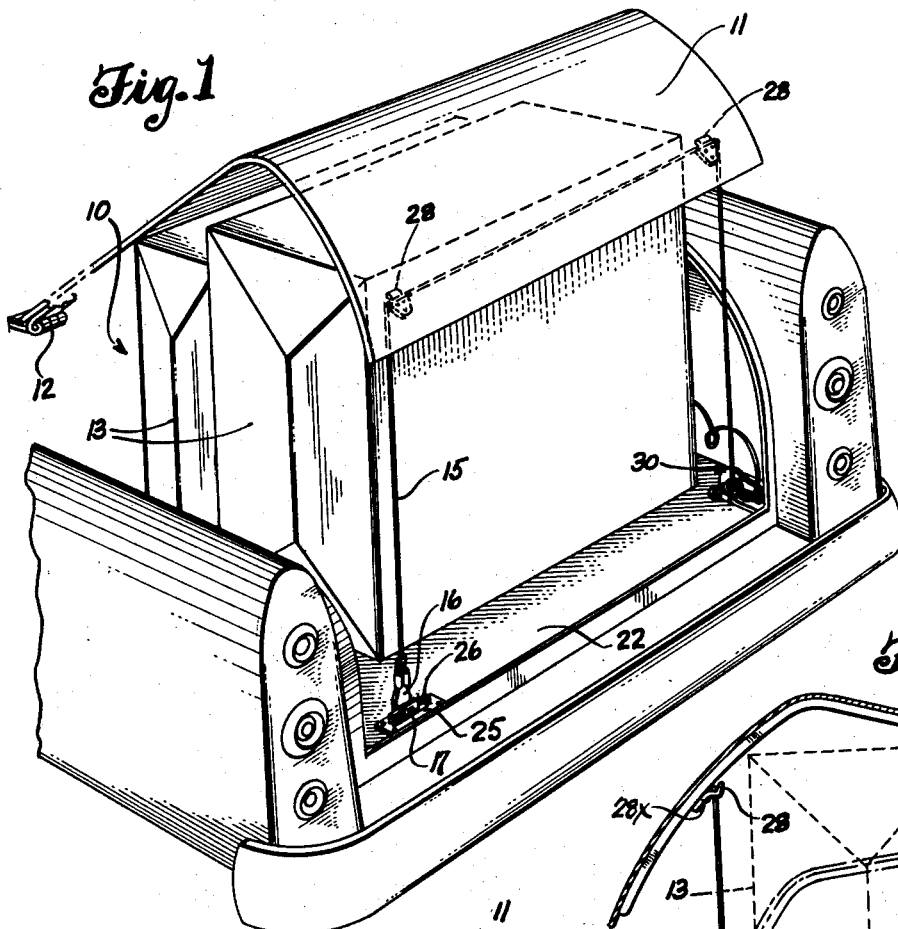
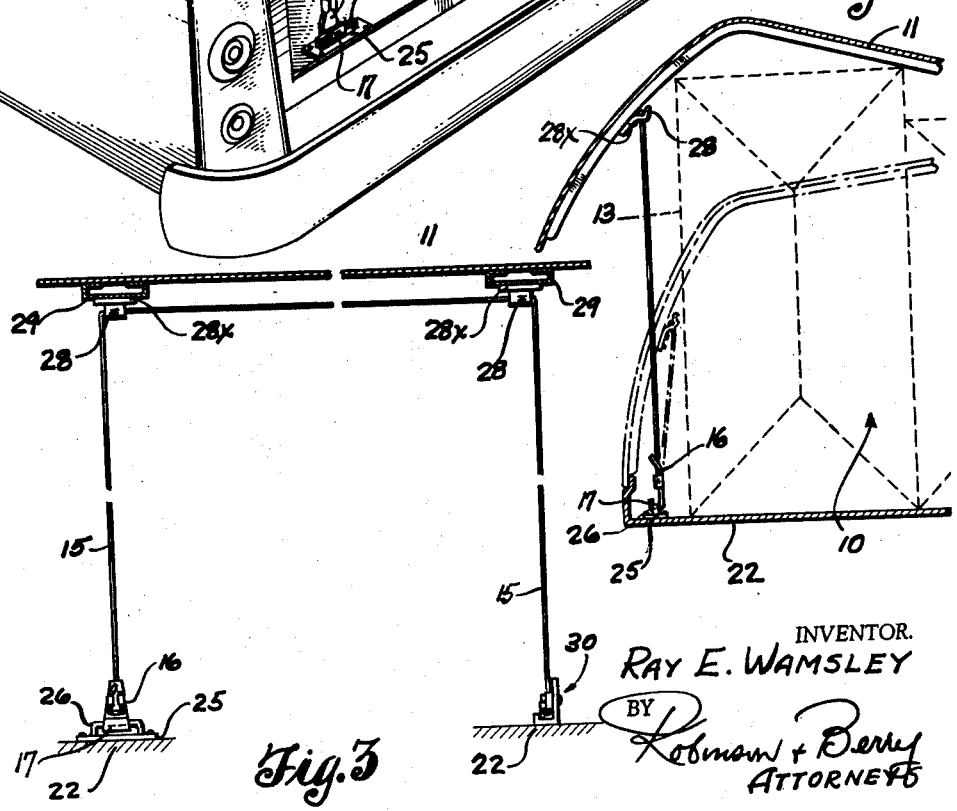
INVENTOR.
RAY E. WAMSLEY
BY
Robinson + Berry
ATTORNEYS

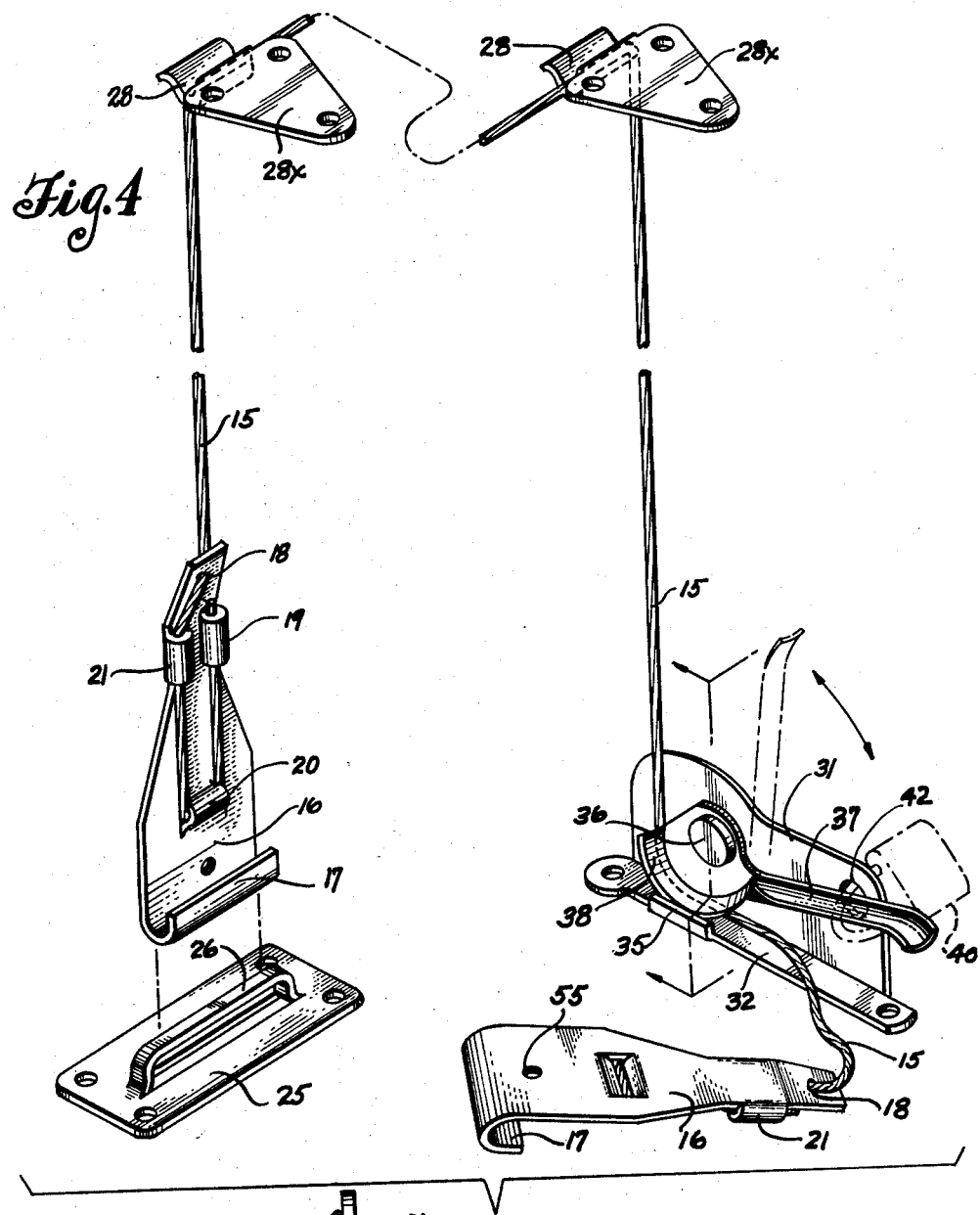
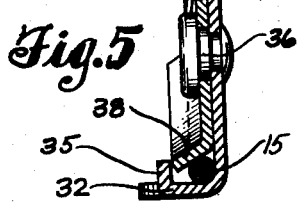

Dec. 15, 1959 R. E. WAMSLEY 2,916,902
ADJUSTABLE FASTENER FOR THE LID OF THE
LUGGAGE COMPARTMENT OF AN AUTOMOBILE
Filed Feb. 4, 1958 3 Sheets-Sheet 3
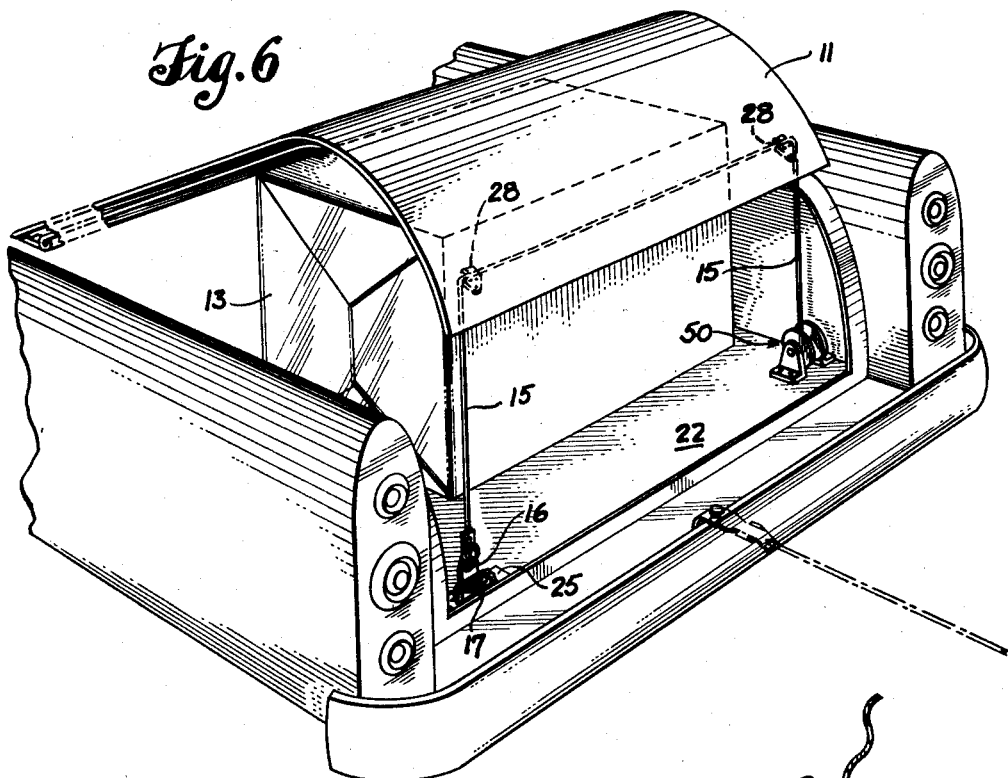
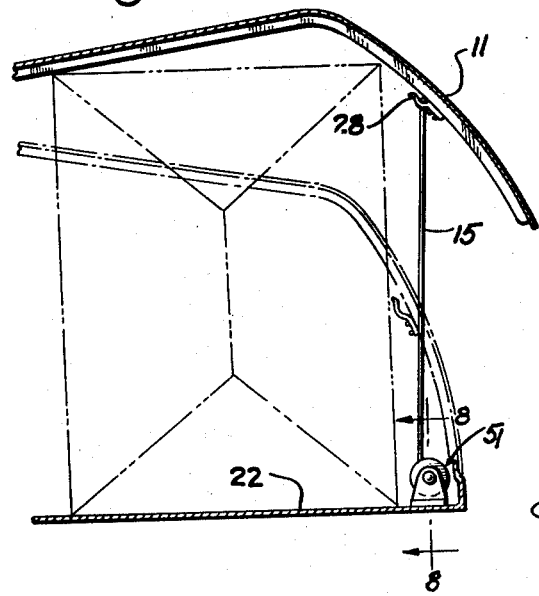
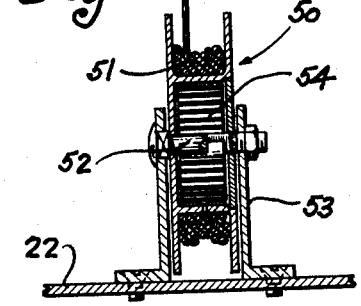
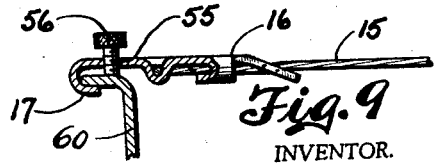
INVENTOR.
RAY E. WAMSLEY
BY
Robinson + Berry
ATTORNEYS

United States Patent Office 2,916,902
Patented Dec. 15, 1959

2,916,902

ADJUSTABLE FASTENER FOR THE LID OF THE LUGGAGE COMPARTMENT OF AN AUTOMOBILE

Ray E. Wamsley, Wapato, Wash.

Application February 4, 1958, Serial No. 713,223

3 Claims. (Cl. 70—93)

This invention relates to new and improved forms of adjustable fasteners for the lid of the luggage compartment, generally referred to as the trunk, of an automobile. More particularly, it has reference to improved fastening means whereby the lid of the trunk, or rear end luggage compartment of an automobile may be secured while in a partially open position against opening to any farther extent.

Explanatory to this invention, it will here be noted that it is frequently desired to transport luggage, boxes or articles of various kinds in the trunk or luggage compartment of an automobile which are of such size that the compartment lid cannot be completely closed and locked. It is the usual practice in such cases, to close the lid as far as possible against the luggage and then secure it by means of a rope or wire tie applied to or about the lid handle if present, or through holes in the reinforcement plate on the underside of the lid and then to a part of the under structure of the body, or to the bumper. Such means and manner of fastening the lid is inconvenient, is not satisfactory for various reasons, and does not insure against unauthorized release of the lid.

In view of the above, it has been the principal object of the present invention to provide an easily applied, relatively inexpensive, practical and adjustable fastening means that permits the partly open lid of the luggage compartment after being drawn as far as possible toward closed position, to be secured and locked against farther opening.

It is also an object of this invention to provide a lid fastening means of the character above described, which includes, as its principal elements, a wire cable or rope of small diameter and substantial length, equipped at one end with a hook-like anchoring means that is applicable to a companion plate that is fixed to the floor of the trunk compartment at one side thereof. Also, including hooks that are applicable to the underside of the lid, at opposite sides and near its opening edge, in positions to receive the cable thereover after the hook-like member at its end has been secured to the companion plate, and including also a cam clamp through which the cable, after being secured at one end and applied over said hooks, can be passed and then drawn taut thus to force the lid down against the luggage, or articles in the compartment and secure it against opening.

Still further objects and advantages of the present invention reside in the details of construction of the various parts above named; in their application to the trunk and lid, and in their mode of use, as will hereinafter be fully described.

In accomplishing the above mentioned and other objects of the invention, I have provided the improved details of construction, the preferred forms of which are illustrated in the accompanying drawings, wherein:

Fig. 1 is a perspective view of the rear end portion of an automobile, showing the rear end trunk, or luggage compartment with its lid secured in a partially open position by the present fastening means.

Fig. 2 is a vertical section, taken through the trunk compartment, showing the cable securing hooks as applied to the underside of the lid, and the application of the cable thereto.

Fig. 3 is a schematic illustration showing the mode of application and securing of the cable.

Fig. 4 is a perspective view illustrating a securing cable as equipped at both ends with attaching hooks and as secured by the hook at one end to the trunk floor, then applied over the hooks that are secured to the underside of the trunk lid and then as applied at its other end to the cam clamp. Also, showing the application of a padlock for locking of the clamp to prevent unauthorized release of the cable.

Fig. 5 is a cross-section of the cam clamp taken on line 5—5 in Fig. 4.

Fig. 6 is a perspective view showing the trunk lid and securing cable, and wherein the cable securing cable has a hook at one end and is adapted to be drawn out from a spring tensioned reel whereby its lid holding tension is maintained.

Fig. 7 is a vertical section of the trunk and lid, and showing the cable as extended from the reel.

Fig. 8 is a cross-sectional view of the cable tensioning reel.

Fig. 9 is a sectional detail showing the mode of using the securing cable as a tow line.

Referring more in detail to the drawings:

In Fig. 1, I have illustrated the rear end portion of a typical present day automobile body enclosing a trunk or luggage compartment 10. This compartment is equipped with the usual type of lid, or cover 11 which is hinged in the usual manner, as indicated at 12, to the vehicle body at its forward edge for swinging of the lid between fully closed and fully open positions. When fully closed, the lid assumes the position in which it is shown in dash lines in Fig. 2. Its hinging provides that it can be swung upwardly from this fully closed position to various open positions. In Fig. 1, the compartment 10 is shown as containing some packages 13 whereby the lid is held against closing to its full extent. It is when in this, or in similar open positions that it is desirable to secure the lid against farther opening. For this purpose I have provided the fastening means embodied by the present invention, which will now be described.

In Figs. 3 and 4, I have shown the various parts of the fastener in one of its present preferred forms. One of the principal elements is a length of nylon or wire rope cable 15, preferably of from 1/8" to 1/4" in diameter, to each end of which an anchor plate 16 is secured. Each plate is formed, as shown in Fig. 4, across one end with a back-turned flange providing a strong hook 17. The other end portion of the plate is formed with a perforation, as at 18, through which the cable is passed, and the cable end portion is then threaded through offset loops of metal 19—20 and 21 that are die struck inwardly from the plate; the end of the cable being welded or otherwise secured in the loop 21 as seen in Fig. 4. Thus the anchor plates 16 are securely attached to the cable ends. This cable ordinarily would be approximately ten feet long, but might be of more or less length, according to desires.

Fixed flatly to the floor 22 of the luggage compartment 10, near one side and near the rear end as best shown in Fig. 4, is a flat, rectangular plate 25 from which a bar 26 is upwardly struck. This bar is adapted to receive the hook 17 of plate 16 about it, as shown in Fig. 3, thus to secure that end of the cable to the trunk floor. The plate 25 may be secured to the floor by screws, bolts or by other suitable means.

Fixed to the underside of the lid, adjacent is opposite side edges and near its rear end edge, as has been shown in Fig. 2, are hooks 28—28, these hooks preferably being of the form shown in Fig. 4 which shows them to comprise flat plates 28x that are welded, riveted, or bolted to the reinforcing members 29 as usually applied to the underside of the lid, with the hooks 28 turned downwardly then forwardly and upwardly to provide a relatively narrow passage between the hook end and the lid for laying the cable in or for removing it from the hooks.

Fixed to the bottom of the trunk compartment, at a location directly opposite the anchor plate 25, is what is herein designated as the cam lock; this part being designated in its entirety in Figs. 1 and 3 by numeral 30.

The cam lock is best shown in Figs. 4 and 5 to comprise a vertical plate 31 with a horizontally turned bottom edge flange 32 that may be formed with holes, through which screws or bolts are passed to fix the plate to the trunk floor or it may be welded in place. At one point between its ends and at its outer edge, the flange 32 is formed with an upturned lip 35, as noted in Fig. 5. Pivoted on the vertical portion of the plate, near one end, by means of a rivet or stud 36, or the like, is a cable clamping lever 37. This lever has a cam flange 38 formed eccentrically at one end about the pivot point 34, adapted to coact with the flange 32 for the gripping of that portion of cable 10 laid between them for securement as in Figs. 4 and 5.

With the various parts of the lid securing means made and assembled in the manner above described, their use would be as follows:

Assuming that an article, package or the like has been placed in the compartment 10 and lid 11 has been closed thereagainst, in the manner shown in Fig. 1, the hook 17 of plate 16 at one end of the cable 15 is first applied about the bar 26 of plate 25. Then the cable is extended upwardly and laid in the hooks 28—28 on the underside of the lid as in Fig. 2, and the free end of the cable is then laid into the cam lock between flange 32 and cam head 38. To permit this, the cam lever 37 is first swung to the upwardly directed position in which it is shown in dotted lines in Fig. 4, thus to provide a cable receiving passage between the flange 32 of plate 31 and the cam flange 38. After the cable has been laid into this passage it is drawn taut by grasping its free end portion. This forces the lid down against the package or article. The cam lever 37 is then swung downwardly to cause the cam head 38 to clamp and hold the cable in its taut condition against release as shown in Fig. 5.

A pad lock 40 may then be applied as shown in Fig. 4, to hold the lever against release from clamping position. For this purpose a hole 42 is formed through plate 31 just above the lever when in its cable securing position. The hasp of the padlock is passed through this hole and above the lever and it cannot then be swung up to released position.

It is to be explained, however, that the tension or pull on the cable will ordinarily hold the cam lever against accidental release, and the lock is not relied on for this purpose. Its use is to positively prevent unauthorized release.

It is to be understood that the design and character of the various hooks and the clamp may be varied to substantial extent without departing from the spirit of the invention.

A particular advantage of the present cam lock resides in the fact that it is not necessary that the cable be threaded through it but can be merely laid into it after the cam lever 37 has been swung upwardly to cable releasing position. This means that the cable can be engaged by the cam lock at any desired point of its length.

In Figs. 6, 7 and 8, I have illustrated an alternative form of lid securing device wherein the cam lock of Fig. 1 has been replaced by a conventional type of spring tensioned reel designated in its entirety by numeral 50, from which the cable 15 is extended. As will be understood, by reference to Fig. 6, that the cable 15 extends from the reel drum 51 upwardly and over the lid hooks 28, then down to the plate 25 to which the anchor plate 16 at its end is attached, as previously explained.

It is shown in Fig. 8 that the reel drum 51 has the cable 15 wound thereon. The drum is revoluble on a supporting bolt 52 that is fixed against turning in the reel frame 53 which in turn is fixed to the floor 22 of the trunk compartment. A coiled spring 54 is contained under tension in the drum with one end fixed to the bolt 52 and its other end fixed to the drum 51. The tension is sufficient to hold the lid firmly against the packages in the compartment.

It is anticipated that the cable 15 as equipped with attaching plates 16 at both ends may be used if needed, as a tow line. In putting it to this use, the plate 16 at one end would be hooked over the inturned rim of the rear bumper 60 of the tow car as shown in Fig. 9, and the other hook likewise applied to the front bumper of the towed vehicle. To insure the secure holding of the plates 16 when so applied to the bumpers, a hole 55 is formed through the plate 16 near the hook 17 and a set screw 56 is applied to this hole for tightening against the bumper flange thus to prevent accidental disconnection.

Trunk lid securing devices of the kind herein disclosed are easy to apply; easy to use, and practical and efficient in their use. The cam lock, which provides for the laying of the cable in it at any point along its length, is especially desirable in the present combination, and can be put to various other analogous uses.

What I claim as new is:

1. In an automobile having a body formed with a trunk and a trunk lid that is hinged to the body to open upwardly away from the trunk floor, an adjustable means for securing said lid against further opening after being closed against an object in the trunk that holds it in a partly open position, said adjustable means comprising a length of cable, an anchoring means fixed to the trunk floor at one side of the trunk, hook-like means fixed to the underside of the trunk lid near its opening edge, said hook-like means being adapted to receive the cable thereover, a cable clamp fixed to the trunk floor near the other side of the trunk, means fixed to one end of said cable adapted to be applied to said anchoring means to secure that end of the cable, and said cable being of such length that it may be passed, when so anchored, over said hook-like means and then laid into said cable clamp, and when so disposed may be drawn taut through said clamp by pull on its free end, and may then be secured in a taut, lid holding condition by closing said clamp thereagainst and means for locking said clamp in fixed position to prevent release of the clamped portion of the cable.

2. The combination recited in claim 1 wherein said cable clamp comprises a frame providing a seat against which said cable will be engaged when laid in the open clamp, and a cam rotatably mounted in the frame and adapted to be rotated to engage the cable, and to coact with the said seat to clamp it against release.

3. The combination recited in claim 2 wherein the cam of the cable clamp has a hand lever extended therefrom for its rotation between cable clamping and releasing positions and said locking means comprises a padlock.

References Cited in the file of this patent

UNITED STATES PATENTS

| | | |
|---|---|---|
| 518,207 | Cassady et al. | Apr. 10, 1894 |
| 2,238,386 | Frank | Apr. 15, 1941 |
| 2,304,649 | McDaniels | Dec. 8, 1942 |
| 2,449,600 | Geiger | Sept. 21, 1948 |
| 2,618,497 | Gardels | Nov. 8, 1952 |
| 2,749,075 | Altergott | June 5, 1956 |
| 2,801,114 | Chapman | July 30, 1957 |